United States Patent Office 3,119,785
Patented Jan. 28, 1964

3,119,785
REACTION PRODUCT OF A GRAFT POLYMER OF ACROLEIN
Gerard E. van Gils, Cuyahoga Falls, Ohio, assignor to The General Tire & Rubber Company, Akron, Ohio, a corporation of Ohio
No Drawing. Filed May 5, 1959, Ser. No. 811,002
7 Claims. (Cl. 260—45.5)

The present invention is directed to the graft polymerization of an alkyl alpha substituted acrolein such as methacrolein on a latex of a polymer of a mono or di vinyl compound such as polyvinyl chloride or a butadiene polymer and a subsequent reaction of the resultant graft polymer with a strong base such as sodium hydroxide to convert aldehyde groups from the depending polyacrolein chains of the graft polymer to methylol and carboxyl groups in a Cannizzaro-like reaction.

Reaction products of an alkyl alpha substituted acrolein polymer and a strong base, preferably sodium hydroxide, have been produced in the past in which most of the aldehyde groups are converted to —CH$_2$OH and —COOH salt groups apparently in alternating positions along the generally linear long chain molecular structure of the acrolein polymer. These products, which may be described as a Cannizzaro type methacrolein reaction product, have been prepared by subjecting a methacrolein polymer or other alkyl alpha substituted acrolein polymer to a base such as sodium hydroxide at a slightly elevated temperature, such as a temperature around 90° C., to form a product having unusual properties. The resultant modified polymer product is characterized by depending hydroxyl and carboxyl salt groups which are apparently spaced along the macro molecule in accordance with the position of original aldehyde groups of the original methacrolein copolymer. Depending upon the salt thus formed, a modified polymer product readily dissolves and disassociates in water to serve as a polyelectrolyte.

While certain of these salts, and particularly the alkali metal salts, can be used as soil stabilizers and detergents, and textile sizes, films of the strong base/polymethacrolein reaction products are generally brittle and not water insoluble merely upon drying which properties are desirable in some applications such as sizes and permanent finishes for textiles. Also adhesive properties of the strong base/polymethacrolein reaction products are not as good as desired for difficult adhesion applications such as the bonding of polyvinyl chloride sheets to metal surfaces.

It is an object of the present invention to provide a graft polymer of an acrolein monomer on a polymer of an organic compound having 1 to 2 vinyl groups such as polyvinyl chloride or a butadiene polymer such as a butadiene-styrene copolymer, a butadiene-acrylonitrile copolymer, polyisoprene etc. which graft polymers form flexible films and water insoluble films upon drying.

It is another object to provide a reaction product of a graft polymer of methacrolein in an aqueous dispersion of a polyvinyl chloride or of a butadiene/styrene copolymer which graft polymer is in the form of an aqueous dispersion and has excellent adhesive properties.

It is an object to provide a method of preparing a new reaction product by grafting an acrolein on a latex of a polymer predominantly formed from an organic compound having one to two vinyl groups such as vinyl chloride or butadiene in a styrene/butadiene copolymer, and subsequently reacting the resultant graft polymer with a strong base such as sodium hydroxide.

It has been found that new and improved reaction products of an alkyl alpha substituted acrolein polymer can be prepared by grafting an acrolein monomer (preferably methacrolein) on a polyvinyl chloride in latex form or a butadiene/styrene copolymer in latex form, and subsequently reacting the graft polymer thus formed with a strong base such as NaOH to convert more of the aldehyde groups of the grafted chains of polymethacrolein to alternate hydroxyl and carboxyl groups in a Cannizzaro-like reaction. The resultant reaction products have definite advantages over the ordinary Cannizzaro-like polymethacrolein reaction products.

Films of the new reaction products of the graft polymers of the present invention are not brittle and become insoluble films merely upon drying as deposited from the latex. While sodium salts of the ordinary Cannizzaro polymethacrolein reaction products form water soluble films upon drying, sodium salts of the strong base/graft polymer reaction products form films which are irredispersible although they are hygroscopic. The ammonium salts of the strong base/graft polymer reaction products form water insoluble films and find use as permanent sizes or finishes for textile fabrics.

The ordinary difficult adhesion of polyvinyl chloride sheets to metal can be accomplished using the new reaction product of a graft polymer of methacrolein upon a polyvinyl chloride latex by merely applying a dispersion of the new reaction product on a clean freshly pickled surface, drying to remove the water, wetting the dry surface with methylethyl ketone or other polyvinyl chloride solvent and thereafter hot-pressing the polyvinyl chloride sheet to the prepared metal surface.

It has also been found that the new reaction products of the present invention can be used advantageously as a swelling retarder for Bentonite particles. Apparently films, for instance sodium salts of the reaction products of the present invention, are water insoluble but permit water to diffuse through them at different rates depending upon the reaction product. It has been found that when Bentonite particles are coated with reaction products of the present invention the swelling of the Bentonite particles is retarded and slowed down. It is noted further that the expansion of the swelling Bentonite particles does not break the flexible rubbery film.

In accordance with the present invention a product is obtained by heating and reacting (1) about 100 parts by weight of a latex of a polymer or copolymer of an organic compound having 1 to 2 vinyl groups such as vinyl chloride or butadiene with (2) about 10 to 50 parts by weight of an alkyl alpha substituted acrolein in an aqueous medium to form a graft polymer, and thereafter reacting the graft polymer with a base having an ionization constant greater than that of ammonium hydroxide. Surprisingly the heating of the graft polymer of polyvinyl chloride apparently does little or no damage to the polyvinyl chloride chain.

As used herein the term "graft polymer of methacrolein on a vinyl chloride polymer" signifies a polymeric product produced by subjecting methacrolein to polymerizing conditions in the presence of a previously formed vinyl chloride polymer. The graft polymers of methacrolein (or other alkyl alpha substituted acroleins) upon vinyl chloride polymers or butadiene/styrene copolymers are the materials produced by adding monomeric methacrolein to an already completed or nearly completed free radical polymerized latex of a vinyl chloride polymer or a rubbery copolymer of butadiene and styrene. Polymerization by free radical mechanisms is then continued. In the resultant product, the methacrolein appears to have combined with the already polymerized vinyl chloride or copolymer of butadiene and styrene. At any rate only small amounts of methacrolein polymer can be separated therefrom by physical method. Such reaction products are referred to in this specification as graft polymers or graft copolymers of methacrolein upon a vinyl chloride polymer or upon a copolymer of butadiene/styrene.

While I do not wish to be held to the following theory, it is believed that centers along the chains of the already polymerized vinyl chloride or styrene/butadiene copolymer are reactivated. These centers then serve to start new side chains of polymerized methacrolein which are branched from and attached to the old vinyl chloride polymer chains. The polymer or copolymer, upon which the methacrolein is to be grafted, may be a latex of a homopolymer of vinyl chloride or a copolymer of vinyl chloride and vinyl acetate in which the vinyl chloride is predominant and preferably comprises about 75 to 95% by weight of the copolymer.

The latex upon which the methacrolein is to be grafted may also be a polydiolefine latex or a latex of a copolymer of (1) butadiene or other conjugated diolefins having less than 7 carbon atoms such as isoprene and dimethyl butadiene in which the conjugated diolefin preferably forms about 60 to 85% by weight the copolymer and (2) a copolymerizable monovinyl compound such as styrene and/or alpha methyl styrene, or alkyl- and halo-nuclear substituted styrenes such as vinyl toluene, dimethyl styrene and dichloro styrene, and/or an ester or nitrile of an acrylic or methacrylic acid such as acrylonitrile, methyl acrylate, methyl methacrylate, 2-ethyl hexyl acrylate etc.

The orginal polymerization of the latex upon which the methacrolein is to be polymerized may be accomplished in accordance with any of the suitable procedures as is well known in the art. In general, the vinyl chloride monomer or the butadiene/styrene monomers are emulsified in water with the aid of emulsifying agents such as sodium oleate and sodium dodecyl sulfonate, naphthalene sulfonate, sodium lauryl sulfate etc. The polymerization medium may also generally contain a suitable water soluble free radical generating catalyst such as hydrogen peroxide, potassium and/or sodium persulphate of which potassium persulfate is preferred.

The graft polymerization is preferably carried out in acid medium and also the emulsifier used to prepare the polyvinyl chloride or styrene/butadiene copolymer latex is preferably one such as Duponol C (sodium lauryl sulphate) which will not be affected by a pH in the range of about 3 to 5. Freshly distilled methacrolein is used in the grafting process and the monomeric methacrolein generally polymerizes easily in about 12 hours at 122° F. although temperatures of about 90° F. to 160° F. can be used for time intervals of 3 to 20 hours. After the graft polymer is formed, the polymethacrolein tail of the graft polymer is preferably converted to a polyetectrolyte by subjecting the graft polymer to a strong base to form a Cannizzaro-like reaction product.

As previously indicated, generally from about 10 to 50 parts by weight of methacrolein or other alkyl alpha substituted acrolein monomers or mixtures thereof are used to graft on to 100 parts by weight of the polymer. The preferred amount is about 20 to 30 parts by weight of methacrolein monomer per 100 parts by dry weight of polymer in latex form in order to obtain the best all around reaction products, the resulting films of the reaction products being more flexible and having a greater degree of water insolubility obtained merely by drying.

As to the preferred conditions for preparing the graft polymer the preferred temperatures are about 110 to 140° F. and the reaction time is about 8 to 16 hours. While the above temperature and time of reaction are preferred, a temperature range of 75 to 150° F. and a reaction time range of 12 to 72 hours may also be used as reaction conditions, particularly when a longer reaction time is used with a lower reaction temperature.

The preferred strong base treated polyacrolein grafted polymer (a Cannizzaro like reaction product of the acrolein grafted polymer) is one prepared by reacting about .4 to .5 mole of NaOH per mole of grafted methacrolein polymer. The preferred strong base treated/grafted polyacrolein product is preferably made by reacting the base and the graft polymer for about 3 to 12 hours at a temperature of about 77 to 97° C. to provide polymers with 15% by weight of the original aldehyde groups unreacted; the remaining aldehyde groups, or about 85%, are converted to approximately equal amounts of $CH_2OH$ and —COOH salt groups. The strong base treated/graft polymer of methacrolein (Cannizzaro methacrolein) is generally utilized for forming flexible films as a 10 to 20% by weight aqueous solution. The preferred aqueous solution is one of about 16 to 17% by weight solids content.

Substantial benefits are obtained in accordance with the present invention when the molecular weight of the polymethacrolein tail to be reacted with a strong base is as low as 500 but for most purposes it is desirable that the average molecular weight be around 1000 up to 5000 or more. The said tail is the polymethyl acrolein polymer chain chemically attached to the base polymer.

In the graft copolymerization reaction a persulfate initiator is preferably added if not already present in the polymerized vinyl latex system to speed up the reaction. Other initiators, such as hydrogen peroxide and benzoyl peroxide, capable of oxidizing or providing free radicals are also satisfactory. Air alone will initiate the reaction but it gives a very slow reaction in comparison to reactions employing conventional initiators.

In order to prepare the new polymethacrolein reaction product the graft polymer is subjected to a base having a disassociation constant greater than $1.8 \times 10^{-5}$, or a base having a disassociation constant greater than that of ammonium hydroxide at 25° C. Preferable bases are hydroxides and basic salts of the substantially water soluble alkali metals, sodium, potassium and lithium. However, any other basic substance having a disassociation constant greater than ammonium hydroxide may be used. Strong organic bases such as di-isobutyl amine, di-isopropyl amine and other secondary or tertiary alkyl amines, preferably having less than six aliphatic carbon atoms, and certain of the imines, such as piperidine, also bring about the desired reaction. The pH of the reaction mixture (base plus polymethacrolein polymer) should be above 8 and preferably around 11 or above.

The Cannizzaro-type reaction apparently reduces part (usually 20 to 45 or even almost up to 50%) of the aldehyde groups of the methacrolein polymer or copolymer to hydroxyl to form an alcohol and oxidizes another equivalent part to carboxyl groups, which in turn react with the base to form the corresponding salt. The reaction is similar to the so-called Cannizzaro reaction. One mole of base is theoretically added for each two moles of methacrolein in the polymer. From 35 to 40 percent up to 50 to 60 percent of the theoretical amount of base is preferably added to the methacrolein polymer to convert about 81–88 percent of the aldehyde groups and when 100 percent of the theroetical amount of base is added the actual conversion is found to be around 90 percent of theoretical aldehyde groups present. Generally, as low as .3 mol of base and as high as 1.5 moles can be used per mole of aldehyde. The present conversion depends upon the amount of base employed. According to the present invention, a polymethacrolein tail is employed in which preferably 83–87% of the aldehyde groups have been converted to hydroxyl and carboxyl groups.

The term "methacrolein polymer tail" is here used generically to include copolymers having substantial methacrolein residues present. Copolymers of methacrolein with one or more diolefinic compounds of less than 8 carbon atoms, including the conjugated diolefines, butadiene, isoprene, chloroprene, cyanoprene, dimethyl butadiene, and/or with a copolymerizable mono-olefinic compounds such as styrene, acrylonitrile, methyl isopropenyl ketone, and other available, olefinically-unsaturated, polymerizable organic compounds can also be used and subjected to the process described above to form compounds with similar unusual properties. As the amount of methacrolein in the copolymer is reduced, however, the number of aldehyde groups in the copolymer is reduced and the unusual effects obtained by the reaction become less apparent and less effective. Copolymers and copolymer mixtures can also be used to vary the effect of the methacrolein and obtain the desired degree of disassociation and hydrophilicity.

In accordance with my invention, copolymers and copolymer mixtures containing methacrolein may be grafted as monomers to a polyvinylchloride latex and subjected to the Cannizzaro type reaction to produce copolymers as desired for specific purposes. For instance, if a copolymer tail with some rubbery characteristics is desired, butadiene is employed in the copolymer tail.

The following example illustrates the preparation of a styrene/butadiene latex and the subsequent graft polymerization of methacrolein upon the latex:

*Example 1*

A styrene/butadiene latex was prepared according to the following recipe:

| Ingredient— | Parts by weight (grams) |
|---|---|
| Butadiene | 75 |
| Washed styrene | 25 |
| MTM (mercaptan modifier) | 0.3 |
| Duponol C (sodium lauryl sulphate) | 4 |
| $Na_4P_2O_7$ | 0.5 |
| $K_2S_2O_8$ | 0.3 |
| Water | 200 |

The above polymerization mixture was reacted at a polymerization temperature of 122° F. for 20 hours. The total solids content of the latex was 32.4% and the conversion was 99%. The washed styrene was a styrene washed with aqueous NaOH solution to remove the inhibitor such as hydroquinone. The mercaptan modifier (MTM) was a mixture of tertiary $C_{12}$, $C_{14}$ and $C_{16}$ alkyl mercaptans (Phillips Petroleum Co.). The above latex was acidified to a pH of 4 with acetic acid. Freshly distilled methacrolein was added and the mixture of monomer and polymer reacted to form a graft polymer in 12 hours at about 122° F. The following recipe was used:

| Ingredient— | Parts by weight (grams) |
|---|---|
| Styrene-butadiene latex | 305 (100 g. polymer). |
| Water | 50. |
| Acetic acid 1% | 30. |
| $K_2S_2O_8$ | 0.2. |
| Methacrolein | 25. |

The polymerization was almost completed after only 6 hours but nevertheless the polymerization was continued for 22 hours total. A good stable latex was obtained with a total solids content of 29.8% by weight.

*Example 2*

After the graft polymerization was completed in Example 1, the graft polymer latex of Example 1 was poured back into the bottle polymerizer and 8 grams of NaOH dissolved in 200 grams of water was added. The reaction at 122° F. was continued for 16 hours. A very viscous latex was obtained with a total solids content of 22.2%. By determining the amount of unreacted NaOH, it was found that 74.9% of the theoretical amount of NaOH was used for the Cannizzaro reaction.

*Example 3*

A series of reaction products of the styrene/butadiene copolymer latex of Example 1 and various amounts of methacrolein monomer were prepared using procedures described in Example 1 and Example 2. The percent reacted of the theoretical amount of NaOH along with the amount of methacrolein used per 100 parts of butadiene/styrene copolymer in the latex is shown in the table below:

| Amount of methacrolein, parts by weight— | Percent theoretical NaOH reacted |
|---|---|
| 25 | 74.9 |
| 100 | 90.5 |
| 25 | 84.3 |
| 75 | 89.5 |

Upon wetting, films from the above reaction products, generally white and take up water readily but do not redisperse. This provides a method of washing away the polymethacrolein or Cannizzaro product of the polymethacrolein which is not grafted upon the butadiene/styrene polymer. It was roughly determined that about 10 to 30% of the methacrolein present was in the form of a free polymer of polymethacrolein and the strong base, namely NaOH.

When the dried films described above are immersed in dilute acetic acid, the sodium salt of the polymethacrolein reaction product (in the form of grafted chains) are transformed into chains in which the sodium atom was replaced by hydrogen so that the chain has alternate methylol and carboxyl groups. On subsequent drying, the films are rendered hydrophobic and are no longer affected by water.

The reaction products in which the grafted polymethacrolein chains are of the ammonium salt provide films which can be obtained by drying which are more flexible than the corresponding films from the sodium salt. Films of the ammonium salt are also sensitive to water. However, upon heating they lose much of this water sensitivity and ultimately become completely insoluble. The ammonium salt derivative can be prepared by coagulating the reaction product in which the grafted chain is the sodium salt with just the right amount of about 10% acetic acid, washing the resultant coagulation several times with deionized water, pressing out the water and thereafter dispersing the reaction product in 10% ammonium hydroxide.

*Example 4*

A graft copolymer of methacrolein upon a vinyl chloride polymer was prepared by reacting 25 grams of methacrolein monomer per 100 grams dry weight of polyvinyl chloride in latex form. The polyvinyl chloride latex was prepared according to the following recipe:

| Ingredients— | Parts by weight |
|---|---|
| Vinyl chloride | 100 |
| $H_2O$ | 200 |
| $K_2S_2O_8$ | 0.2 |
| $NaHCO_3$ | 0.2 |
| Duponol C (Sodium lauryl sulphate) | 3.0 |

The graft polymer was formed by reacting the polyvinyl chloride latex and the methacrolein for about 12 hours at 122° F. After the conversion to graft polymer was complete 8 grams of NaOH and 200 grams of water were added to the bottle polymerizer and the subsequent mixture reacted for about 8 hours.

Two reaction products were prepared and the percent of theoretical NaOH was high in both cases, being 78.3% in one case and 80% in another case.

In the above examples, the sodium salt of the polymethacrolein reaction product (polymethyl propenol-sodium methacrylate) is used as the grafted methacrolein tail. However, the above described sodium salt tail may be partially or wholly a tail comprising other alkali and/or alkaline earth metal salts of poly-alkylalpha substituted-acrolein reaction products which have the recurring units of the following general formula:

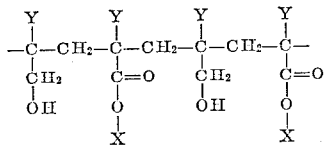

where Y is an alkyl group of 1 to 12 carbon atoms and preferably 1 to 5 carbon atoms for the best binding action, and where X is preferably Na, K, Li and Ca or even a cation having the formula

in which $R_1$, $R_2$ and $R_3$ are selected from a member of the group consisting of hydrogen, alkyl and alkyl-aryl radicals having less than 6 aliphatic carbon atoms. Examples of the above described salts are polymethyl propenol sodium methacrylate, polyethyl propenol-sodium methacrylate, polymethyl propenol-potassium methacrylate, polymethyl propenol-lithium methacrylate, polyethyl propenol-potassium methacrylate and even ammonium or amine salts including polymethyl propenol-ammonium methacrylate, polymethyl propenol-dimethyl ammonium methacrylate, polymethyl propenol-ethyl phenyl ammonium methacrylate, polyethyl propenol-ethyl phenyl ammonium methacrylate, polymethyl propenol-dimethyl ammonium methacrylate, polymethyl propenol-propyl dimethyl ammonium methacrylate and poly propyl propenol-diamyl ammonium methacrylate. While any of the above salts can be used as the polyelectrolyte tail of the graft polymer, the best results are obtained when X is Na. The polyalkyl substituted acrolein reaction products may be prepared in the same manner as illustrated for polymethylpropenol sodium methacrylate except that alkyl alpha substituted-acrolein monomers such as ethyl acrolein and propyl acrolein and other alkyl substituted monomers having the formula:

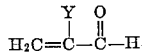

(where Y is an alkyl radical of 1 to 12 carbon atoms and Y is preferably methyl and ethyl for the best results) may be substituted for all or part of the methacrolein monomer starting material which is to be grafted upon a polymer of vinylchloride or a copolymer of butadiene and styrene.

While this invention has been described with reference to certain specific embodiments, it is to be understood that it is not limited thereto.

Having described my invention, I claim:

1. A composition of matter comprising an organic polymeric material selected from the group consisting of (I) homopolymers of conjugated dienes having less than 7 carbon atoms, (II) copolymers of conjugated dienes having less than 7 carbon atoms and at least one monomer selected from the group consisting of styrene, alpha methyl styrene, vinyl toluene, dimethyl styrene, dichlorostyrene, acrylonitrile, methyl acrylate, methyl methacrylate, and 2-ethyl hexyl acrylate, (IIII) polyvinyl chloride and (IV) a copolymer of vinyl acetate and a predominant amount of vinyl chloride and having copolymerized onto said first named polymeric material a polymer from a monomeric composition having the formula

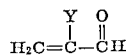

where Y is an alkyl group of from 1 to 12 carbon atoms, the parts by weight ratio of said first named polymeric material to said copolymerized monomeric composition being from about 100:100 to 100:10.

2. A composition of matter comprising an organic polymeric material selected from the group consisting of (I) homopolymers of conjugated dienes having less than 7 carbon atoms, (II) copolymers of conjugated dienes having less than 7 carbon atoms and at least one monomer selected from the group consisting of styrene, alpha methyl styrene, vinyl toluene, dimethyl styrene, dichlorostyrene, acrylonitrile, methyl acrylate, methyl methacrylate, and 2-ethyl hexyl acrylate, (III) polyvinyl chloride and (IV) a copolymer of vinyl acetate and a predominant amount of vinyl chloride, and having graft copolymerized onto said first named polymeric material an alkyl alpha substituted acrolein monomer having from 1 to 12 carbon atoms in said alkyl group to form a polymeric compound on said polymeric material, said polymeric compound having a substantial number of recurring units of the formula

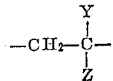

where Y is an alkyl group of from 1 to 12 carbon atoms, where Z comprises from about 20 to 45% by weight of —$CH_2OH$ groups, from 20 to 45% by weight of —COOX groups and the balance —CHO groups, where X is selected from the class consisting of H, Na, K, Li and —$NHR_1R_2R_3$ radicals where $R_1$, $R_2$ and $R_3$ are selected from the group consisting of H, alkyl and alkyl-aryl groups having less than 6 aliphatic carbon atoms, the parts by weight ratio of said first named polymeric material to said polymeric compound being from about 100:50 to 100:10.

3. A composition of matter according to claim 2 where the parts by weight ratio of said first named polymeric material to said polymeric compound is from about 100:30 to 100:20, and where X is sodium.

4. A composition of matter according to claim 3 where Y is methyl.

5. A composition of matter according to claim 4 where said first named polymeric material is polyvinyl chloride.

6. A composition of matter according to claim 4 where said first named polymeric material is a rubbery copolymer of 60 to 85% by weight of butadiene and the balance styrene.

7. A composition of matter according to claim 4 where said first named polymeric material is a copolymer of from about 75 to 95% by weight of vinyl chloride and the balance vinyl acetate.

References Cited in the file of this patent

UNITED STATES PATENTS

| | | |
|---|---|---|
| 2,332,896 | D'Alelio | Oct. 26, 1943 |
| 2,388,167 | Marple | Oct. 30, 1945 |
| 2,569,932 | Izard | Oct. 2, 1951 |